United States Patent
Rupert et al.

[11] Patent Number: 6,125,990
[45] Date of Patent: Oct. 3, 2000

[54] INFEED SLUG LOADER

[75] Inventors: Michael S. Rupert, Watkinsville; William A. Campbell, III, Athens; Mickey A. Poole, Nicholson, all of Ga.

[73] Assignee: Campbell-Hardage, Inc, Athens, Ga.

[21] Appl. No.: 09/283,242

[22] Filed: Apr. 1, 1999

[51] Int. Cl.[7] .................................................. B65G 47/26
[52] U.S. Cl. .................. 198/419.3; 198/449; 198/418.9; 198/462.2
[58] Field of Search ................................ 198/419.3, 449, 198/418.9, 462.2

[56] References Cited

U.S. PATENT DOCUMENTS

| | | |
|---|---|---|
| 2,247,673 | 7/1941 | Thum . |
| 2,247,694 | 7/1941 | Papendick . |
| 2,325,862 | 8/1943 | Jepson . |
| 3,077,257 | 2/1963 | Niederer et al. . |
| 3,084,783 | 4/1963 | Morton et al. . |
| 3,224,550 | 12/1965 | Nigrelli et al. . |
| 3,225,510 | 12/1965 | Jones et al. . |
| 3,292,505 | 12/1966 | Wiseman . |
| 3,339,701 | 9/1967 | Weichhand . |
| 3,743,118 | 7/1973 | Fluck . |
| 3,927,508 | 12/1975 | Campbell, III . |
| 4,018,327 | 4/1977 | Goodman et al. ........................ 198/723 |
| 4,244,460 | 1/1981 | Groundwater ........................... 198/429 |
| 4,564,104 | 1/1986 | Anderson .............................. 198/419.2 |
| 4,590,743 | 5/1986 | Hardage . |
| 4,712,356 | 12/1987 | Hardage et al. . |
| 4,736,570 | 4/1988 | Hardage et al. . |
| 5,014,496 | 5/1991 | Davis et al. . |
| 5,035,315 | 7/1991 | Fukusaki et al. ...................... 198/419.2 |
| 5,052,166 | 10/1991 | Ziegler et al. . |
| 5,095,684 | 3/1992 | Walker et al. . |
| 5,235,796 | 8/1993 | Campbell, III et al. . |
| 5,246,097 | 9/1993 | McCoy et al. ........................... 198/448 |
| 5,311,722 | 5/1994 | Staton . |
| 5,449,060 | 9/1995 | Mojden et al. ....................... 198/419.1 |
| 5,761,883 | 6/1998 | Pruett et al. ............................... 53/448 |
| 5,873,448 | 2/1999 | Tsai et al. ............................... 198/360 |

FOREIGN PATENT DOCUMENTS

| | | |
|---|---|---|
| 376047 | 4/1964 | Switzerland . |
| 1444277 | 7/1976 | United Kingdom . |
| 2101973A | 4/1982 | United Kingdom . |

Primary Examiner—Christopher P. Ellis
Assistant Examiner—Jeffrey A. Shapiro
Attorney, Agent, or Firm—Richard C. Litman

[57] ABSTRACT

An infeed slug loader provides for the formation of stacks or slugs of individual articles, and transfers the completed slugs to a wrapping machine. The present slug loader may be used to assemble stacks or slugs of various relatively small and flat articles, but is particularly well suited for handling food articles such as cookies, crackers, and the like. The slug loader accepts articles delivered sequentially on a delivery conveyor, and stacks them on a slope by using a turnover wheel which inserts each unit of the stack from the bottom. The use of a slope for slug assembly, obviates the need for a leading retainer for the slug at this point. The turnover wheel is mechanically linked to the infeed conveyor, with a trailing finger or pin picking up the bottom of the slug when a predetermined number of units have been stacked to form the slug. The slug is then pushed up the slope to a horizontal run, where a retractable lead finger or pin extends to hold the front end of the slug. The leading and trailing fingers or pins are laterally offset from the chain, so that two or more such lines may be merged, with the chains running parallel to one another and the fingers aligned linearly with one another. The fingers or pins of such plural chains are staggered, to merge completed slugs into a single line to a wrapping machine.

20 Claims, 9 Drawing Sheets

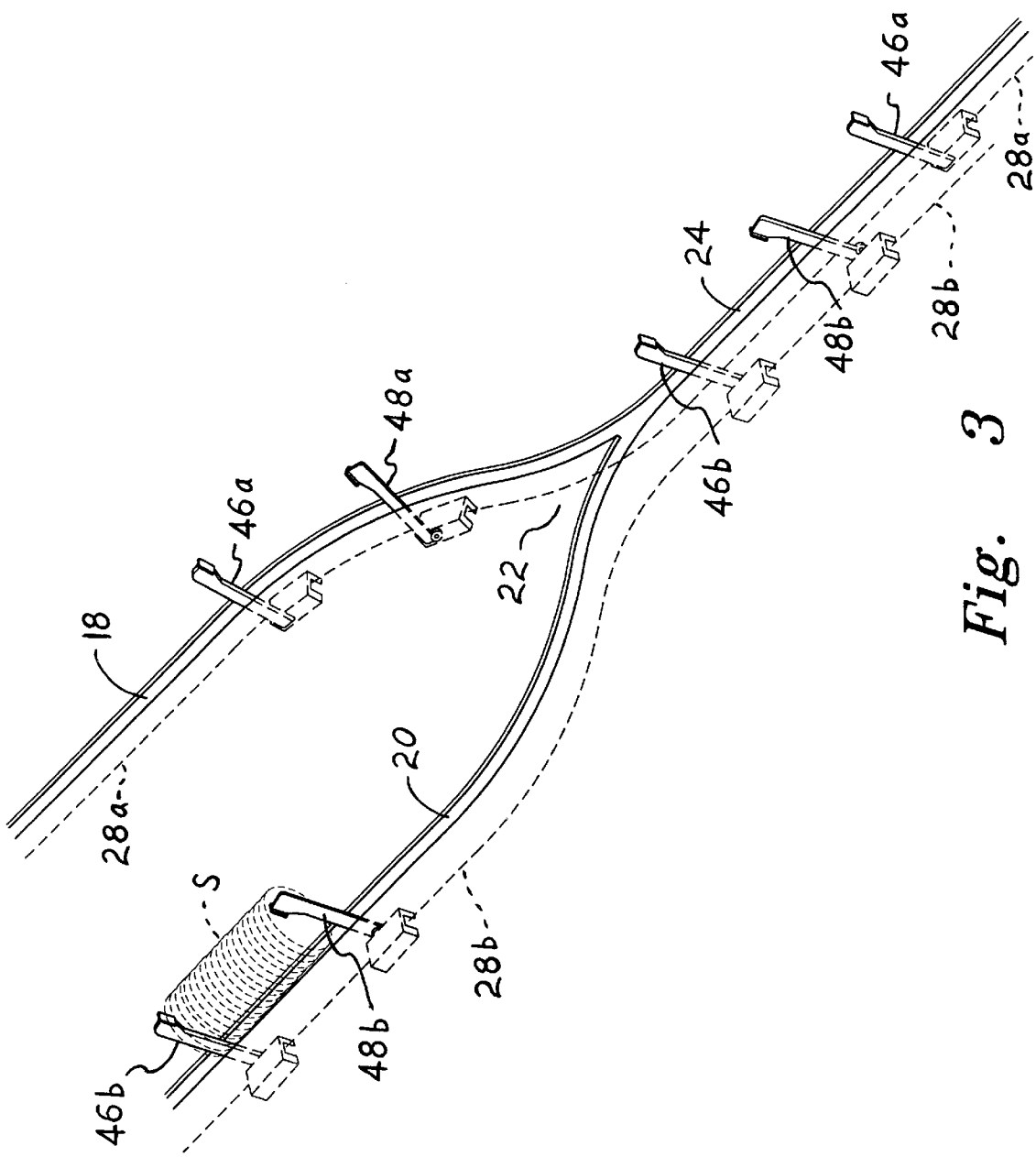

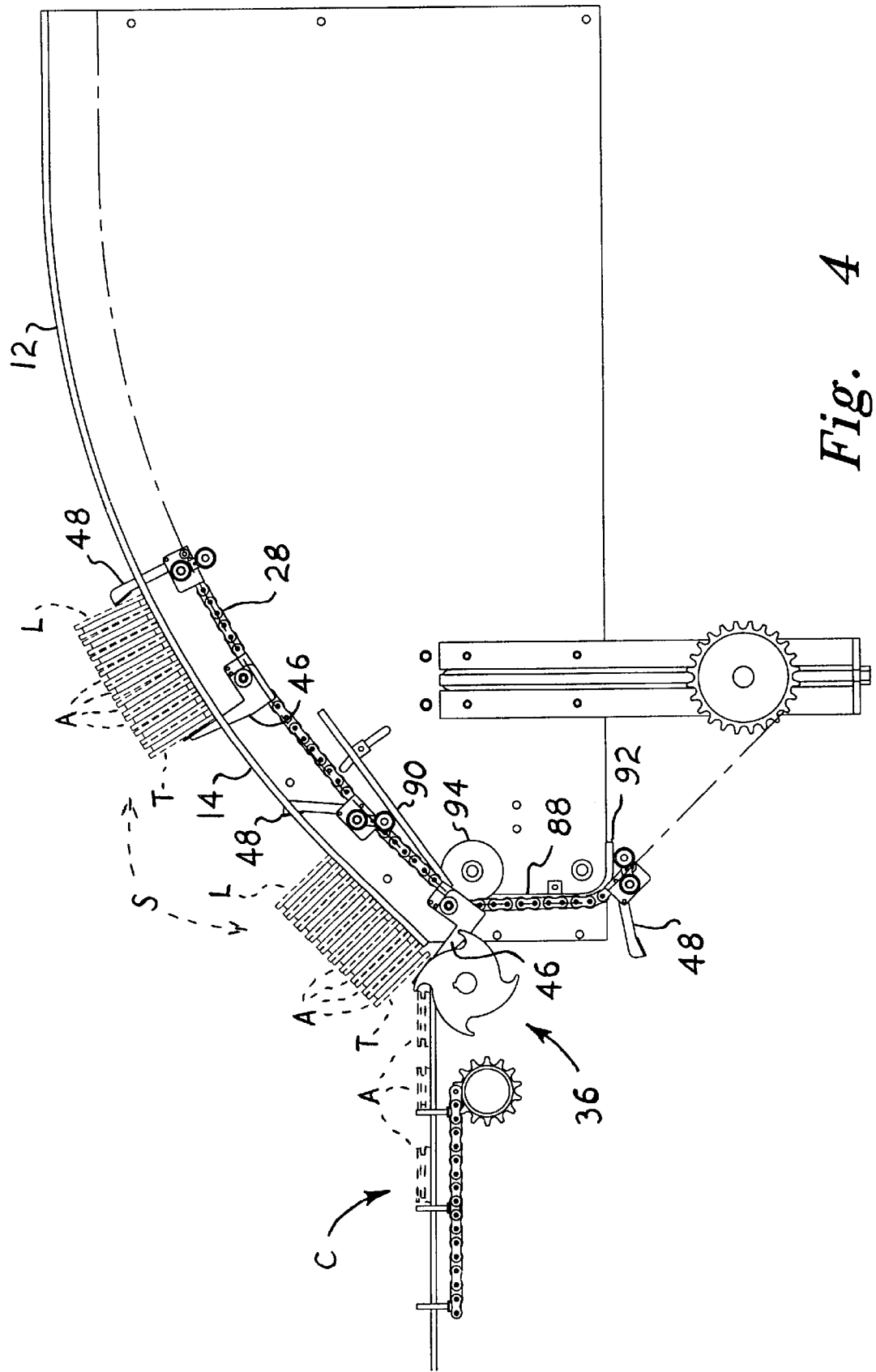

INFEED SLUG LOADER

BACKGROUND OF THE INVENTION

1. Field of the Invention

The present invention relates generally to industrial conveyor mechanisms, and more specifically to a conveyor apparatus for accepting individual units, or "slugs," of a product and stacking the slugs for packaging in a packaging machine. The present slug loader accepts horizontally disposed individual slugs and stacks them back to face using both fixed and automatically extending and retracting fingers or pins for holding the slug assemblies on a conveyor line. The stacked assemblies are then merged from two (or more) stacking sections, into a single line for packaging.

2. Description of the Related Art

The automated processing of various articles is a goal of practically every industry, in order to save the costs of labor. Even when a particular operation has been automated to a certain extent, there may be some means for increasing the efficiency of the existing automation, e. g., by providing a machine which is capable of performing the work of two or more previously existing machines, or perhaps providing a more efficient means of accomplishing a task handled by an earlier machine.

This is particularly true in the food processing industry, where automation is particularly valuable in reducing or eliminating food handling by human personnel and accompanying sanitation concerns, and where food articles must be handled extremely rapidly for economical operation due to the relatively inexpensive cost of each unit. Accordingly, various automated devices have been developed in the past for automatically baking, assembling, and/or otherwise processing various food articles (cookies, crackers, etc.), and then stacking them for packaging.

One such machine, made by the Peters Company, is used for forming and transferring "slugs," or stacks of a food article, for packaging. However, the Peters slug loading machine has its drawbacks. First, the Peters machine (as well as others) utilizes overhead mechanisms to advance the slugs, which may result in lubricants and/or other foreign matter falling and contaminating the food. Also, the Peters machine transfers the formed slugs ninety degrees from their orientation when being formed, and then requires another ninety degree turn to the wrapping machine. This leads to higher breakage rates and operating costs with the Peters machine, compared to the present infeed slug loader with its increased operational efficiency.

Accordingly, a need will be seen for an automated infeed slug loader which turns individual units of a generally flat product from a horizontal tandem orientation to a stacked configuration for packaging. The present machine accomplishes this function by routing the products up a slope and gathering them on the slope, where gravity retains the stack against the stacking wheel until a lower or following pin or finger on the conveyor line reaches the stack. After a predetermined number of the units are gathered to form the slug, an upper or forward pin or finger captures the uppermost or forwardmost unit, sandwiching the elements of the slug between the rearward and forward pins.

Preferably, two or more such assemblies are provided, which merge the slugs formed on each line into a single line for more rapid packaging of the product. More than two such lines may be formed, merging into a single packaging line, if so desired.

A discussion of the related art of which the present inventor is aware, and its differences and distinctions from the present invention, is provided below.

U.S. Pat. No. 3,743,118 issued on Jul. 3, 1973 to Rene Fluck, titled "Stacking Device For Regularly Shaped, Flat Articles, For Examples Biscuits Or Cookies," describes a conveyor system in which longitudinally and laterally disposed cookies or the like are gathered in individual lateral rows of a conveyor. A mechanism stacks the cookies laterally across the conveyor, to form a single stack of cookies in each lateral row. Each stack is then turned ninety degrees to drop into a discharge slide. In contrast, the present mechanism gathers cookies or the like from two or more tandem rows and stacks them from below to form slugs, with each slug being transferred longitudinally along a conveyor line. The present system also merges two or more lines into a single line, which mechanism is not disclosed in the U.S. Patent to Fluck.

U.S. Pat. No. 3,927,508 issued on Dec. 23, 1975 to William A. Campbell, III, titled "Article Loading Machine," describes a conveyor system in which plural, previously stacked slugs or groups of cookies or the like make a ninety degree turn down plural chutes, to be carried as vertical stacks to another ninety degree turn where they are dropped into trays for packaging. The Campbell, III '508 U.S. patent does not disclose any mechanism for stacking the cookies or forming slugs of cookies or other articles, as provided by the present conveyor mechanism. Moreover, the Campbell, III '508 U.S. patent does not disclose any shallow angular merging of two or more slug lines into a single coplanar slug line, as provided by the present conveyor system invention.

U.S. Pat. No. 4,590,743 issued on May 27, 1986 to Timothy W. Hardage, titled "Tray Loading Method And Apparatus," describes a system having a plurality of conveyor belts in series, each operating at different speeds at different times so as to group cookies or other articles thereon at some points, and spread them apart at other points. A turning wheel is used to turn cookies from a horizontal position to stacked slugs, but the slugs are horizontally disposed within a drum which turns to deliver the cookies to trays below the drum. The present infeed slug loader system uses the turning wheel to stack the cookies or other articles on a sloped conveyor run, with gravity holding the articles in the stack while it is being formed. The stack is then transferred up the slope to a horizontal run, where it is merged with one or more additional runs for transfer to a packaging machine.

U.S. Pat. No. 4,712,356 issued on Dec. 15, 1987 to Timothy W. Hardage et al., titled "Tray Loader," describes a machine which is closely related to the machine described in the '743 U.S. patent to the same inventor, discussed immediately above. The primary difference is that the mechanism of the '356 U.S. patent includes moving fingers or pins within the stacking drum, to hold the cookies in the desired vertical alignment. The present invention accomplishes the holding of the stacks during formation, by means of gravity and the sloped ramp along which the stacks or slugs are formed, rather than using a relatively complex mechanism for adjusting the positions of the fingers or pins during stacking, as in the Hardage et al. '356 U.S. patent. Also, the '743 U.S. patent does not disclose any means for merging two or more stacking lines into a single packaging line, as provided by the present infeed slug loader machine.

U.S. Pat. No. 4,736,570 issued on Apr. 12, 1988 to Timothy W. Hardage et al., titled "Automatic Cookie Loading Machine With Double Discharge," describes a conveyor system in which cookies are directed to one or the other of two sides thereof, and transferred down a sloped belt. The cookies are held in place on the belt by closely placed overlying conveyors. The cookies are essentially on edge at this point, and drop into an intermediate receptacle. When the receptacle is filled, it is inverted to drop the cookies into a tray positioned below the receptacle. No stacking of slugs using an upward slope, or merging of plural lines into a single line, is provided by the Hardage et al. '570 U.S. patent.

U.S. Pat. No. 5,014,496 issued on May 14, 1991 to Bill E. Davis et al., titled "Method Of And Apparatus For Continuous Bakery Product Wrapping," describes a wrapping machine, as opposed to a stacker or loading machine as provided by the present infeed slug loader. No disclosure is made in the Davis et al. '496 U.S. patent of any means of stacking baked or other goods to form slugs, nor for merging two or more lines of slugs into a single line for efficient wrapping or packaging thereof, as provided by the present infeed slug loader invention.

U.S. Pat. No. 5,052,166 issued on Oct. 1, 1991 to Beda Ziegler et al., titled "Method And Apparatus For Continuous Package Making," describes a wrapping machine using a partial vacuum for assisting in holding the wrapping about the product. No means of forming stacks or slugs of a product is disclosed by Ziegler et al., as the disclosed apparatus shows the slugs as already having been formed in a previous operation before arriving at the Ziegler et al. wrapping machine. Moreover, the Ziegler et al. apparatus does not provide two or more lines which are merged into a single line, as in the present apparatus. Also, while the Ziegler et al. apparatus discloses leading and trailing fingers for holding the leading and trailing articles in a stack or slug, no means is disclosed for folding or articulating any of the fingers relative to the conveyor line to which they are secured, which means is provided for the leading fingers or pins of the present infeed slug loader invention.

U.S. Pat. No. 5,095,684 issued on Mar. 17, 1992 to William D. Walker et al., titled "On Edge Cookie Loader," describes an apparatus in which stacking of cookies is accomplished by progressively slower conveyor belt runs, causing the cookies to stack or pile up behind one another. The stacking run is a strictly horizontal process, with no slope being provided for assisting in the stacking, as with the present slug loader device. Moreover, the mechanism comprises only a single line, rather than the two or more lines which are merged into a single line, as in the present slug loader machine. The Walker et al. mechanism requires additional electronic componentry for counting the number of articles to be packaged, whereas the present machine utilizes a strictly mechanical system by means of the turnover wheel, which is mechanically linked or geared to the remainder of the mechanism.

U.S. Pat. No. 5,235,796 issued on Aug. 17, 1993 to William A. Campbell, III et al., titled "Method And Apparatus For Packaging Articles," describes an electromechanical system for loading cookies from a conveyor into trays. The mechanism loads serially positioned articles from a conveyor into a generally vertically disposed holder, which pivots to drop the stack or slug into a tray positioned below the loader. The loader arm may include two separate compartments, for simultaneously loading two trays in tandem. No upwardly sloped stacking area, merging of plural lines into a single line, or purely mechanical means of determining the proper number of articles in a stack for transport to the wrapper is disclosed, as provided by the present mechanism.

U.S. Pat. No. 5,311,722 issued on May 17, 1994 to Colleen Staton, titled "Handling and Loading Batches Of Products On Edge," describes a conveyor system using a turnover wheel for stacking articles on edge from a tandem array on a first belt system. A plurality of permanently extended fingers or pins extend from the second belt system, to define the length of each assembled stack of articles. The first and second belt systems comprise a plurality of separate belts having a gap between each belt, in order to provide clearance for the extended pins. In contrast, the present system utilizes chain drives, with the trailing pins remaining permanently extended but with the leading pins being retractable and extendible in accordance with cam ramps located at predetermined positions along the chain run. The Staton system does not stack articles using a slope to define the stack, as in the present system, nor does Staton provide any means for merging two or more lines into a single line, as provided by the present infeed slug loader invention.

Swiss Patent Publication No. 376,047 published on Apr. 30, 1964 illustrates a conveyor packaging system utilizing a series of spacers along a belt or chain drive. The spacers are actuated to position themselves between horizontal slugs of articles on a lower belt or line, with the articles then being wrapped at the end of the line. No stacking mechanism is disclosed in the Swiss Patent Publication, as the articles are already stacked in the drawings. Moreover, the separating mechanism runs in an overhead conveyor, whereas the present machine utilizes underlying mechanisms.

Finally, British Patent Publication No. 1,444,277 published on Jul. 28, 1976 to Baker Perkins Holdings Limited, titled "Improvements In Wrapping Machines," describes a machine for handling a single line of previously formed horizontally disposed stacks or slugs of biscuits (the British term for cookies). A series of permanently extended fingers extends from an overhead conveyor to hold the leading and trailing units of each slug in place. When the slug reaches the wrapper, the overhead conveyor ends and two opposite side conveyors engage the wrapping material with flexible supports between each slug, in order to retain the integrity of each slug through the wrapping process. The British Patent Publication does not disclose any means for forming such slugs, as is accomplished by the present conveyor invention, but rather is directed to wrapping the previously formed slugs. Moreover, the British Patent Publication does not disclose any means of merging two or more slug lines into a single line, and utilizes an overhead conveyor with its potential drawbacks as discussed further above, unlike the present infeed slug loader invention.

None of the above inventions and patents, taken either singly or in combination, is seen to describe the instant invention as claimed.

SUMMARY OF THE INVENTION

The present invention comprises an infeed slug loader, for forming stacks or slugs of individual articles such as baked goods (e. g., cookies, crackers, etc.) and for transferring the formed slugs to a wrapping machine. The present machine picks up the articles from a delivery conveyor in which the articles are distributed sequentially, and stacks them on an inclined slope by means of a bottom stacking turnover wheel. An infeed conveyor picks up the formed stack or slug when it is completed, and carries the slug up the slope to a generally horizontal run, where the slugs are transferred to a wrapping machine. The infeed conveyor utilizes both permanently extended fingers or pins, which pick up the trailing unit in a slug, and retractable and extendible fingers or pins, with the extension and retraction being controlled by cam ramps beneath the conveyor run. The fingers or pins extend upwardly through a slot in the infeed line; there is no overhead mechanism to potentially contaminate the slugs with foreign matter.

The fingers or pins are laterally offset from the conveyor chain. This permits two or more such lines to be merged into a single line for greater efficiency at the wrapper. The left side line has pins offset to the right, with the right side line having its pins offset to the left. Thus, the two lines or chains may be merged to run adjacent to one another, with the pins meshing in a single linear array for carrying the formed slugs to the wrapper.

Accordingly, it is a principal object of the invention to provide an improved infeed slug loader for handling various articles delivered by conveyor means, but most particularly for handling relatively small articles of food, such as cookies, crackers, and the like.

It is another object of the invention to provide an improved infeed slug loader for forming stacks or slugs of a plurality of articles as delivered sequentially to the slug loader.

It is a further object of the invention to provide an improved infeed slug loader which forms slugs using a turnover wheel to stack the slugs from the bottom along an inclined slope, in order to avoid need for a leading retention means during slug formation.

An additional object of the invention is to provide an improved infeed slug loader which is devoid of any overhead conveyor means and which accomplishes all timing operations mechanically, rather than utilizing any electronic means.

Still another object of the invention is to provide an improved infeed slug loader which may comprise two or more tracks which merge to a single track to a downstream wrapping machine.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 3 is a broken away perspective view of the track or line configuration for merging slugs from two separate lines, into a single line.

FIG. 4 is a detailed side elevation view in section of the sloped slug stacking area of the present infeed slug loader.

Similar reference characters denote corresponding features consistently throughout the attached drawings.

DETAILED DESCRIPTION OF THE PREFERRED EMBODIMENT

The present invention comprises an infeed slug loader, for accepting individual units of a flat product (e. g., cookies, crackers, etc.) disposed in a tandem array upon at least one conveyor line, and stacking the articles from the bottom to a predetermined height. When the desired stack height is reached, the stack is transferred up the stacking slope to a generally horizontal line, where the line is merged with one or more identical lines. The merging lines are out of phase with one another, so the stacks do not interfere with one another during the merge, but blend with one another to form an essentially continuous line of horizontally stacked products.

Figure 1:
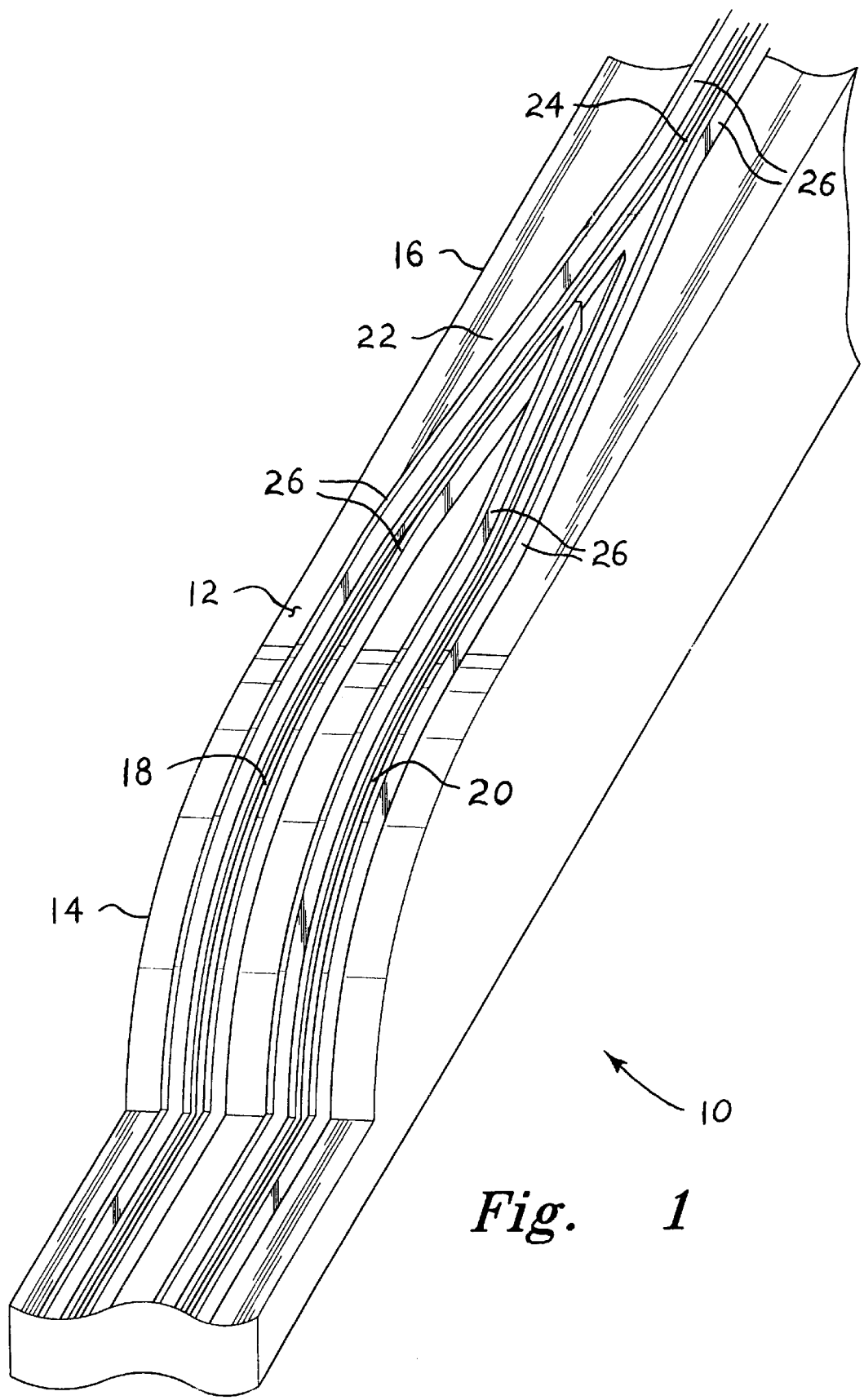
FIG. 1 is a broken away perspective view of a portion of the present infeed slug loader, showing the general layout of the sloped stacking lines and merging of two lines into a single line.

FIG. 1 illustrates the general configuration of the present infeed slug loader 10. The mechanism 10 includes a top plate 12 extending from a slug forming slope 14, which transitions to a generally horizontal run 16. The stacking slope 14 includes laterally spaced apart first and second slots, respectively 18 and 20, through which a series of conveyor pins or fingers extend for the transfer of slugs of articles along the present infeed slug loader 10. The conveyor pin mechanisms are shown in detail in subsequent drawing Figures. The two slots 18 and 20 continue to an intermediate merge area 22, where the slots 18 and 20 converge toward one another, and finally merge into a single slot 24. The merging mechanism is also illustrated in detail in subsequent drawing Figures, and described further below. The various slot areas 18 through 24 may have retaining walls 26 to each side thereof.

FIG. 1 clearly illustrates that the various mechanisms for driving the present infeed slug loader 10, are concealed beneath the top plate 12 (with the exception of the pin or finger extensions, discussed further below and shown in other drawing Figures). Thus, the present mechanism 10 is devoid of any overhead mechanisms, thereby precluding any chance that lubricants, foreign matter, etc., may fall into the articles being transported along the top plate 12 of the slug loader 10.

Figure 2A:
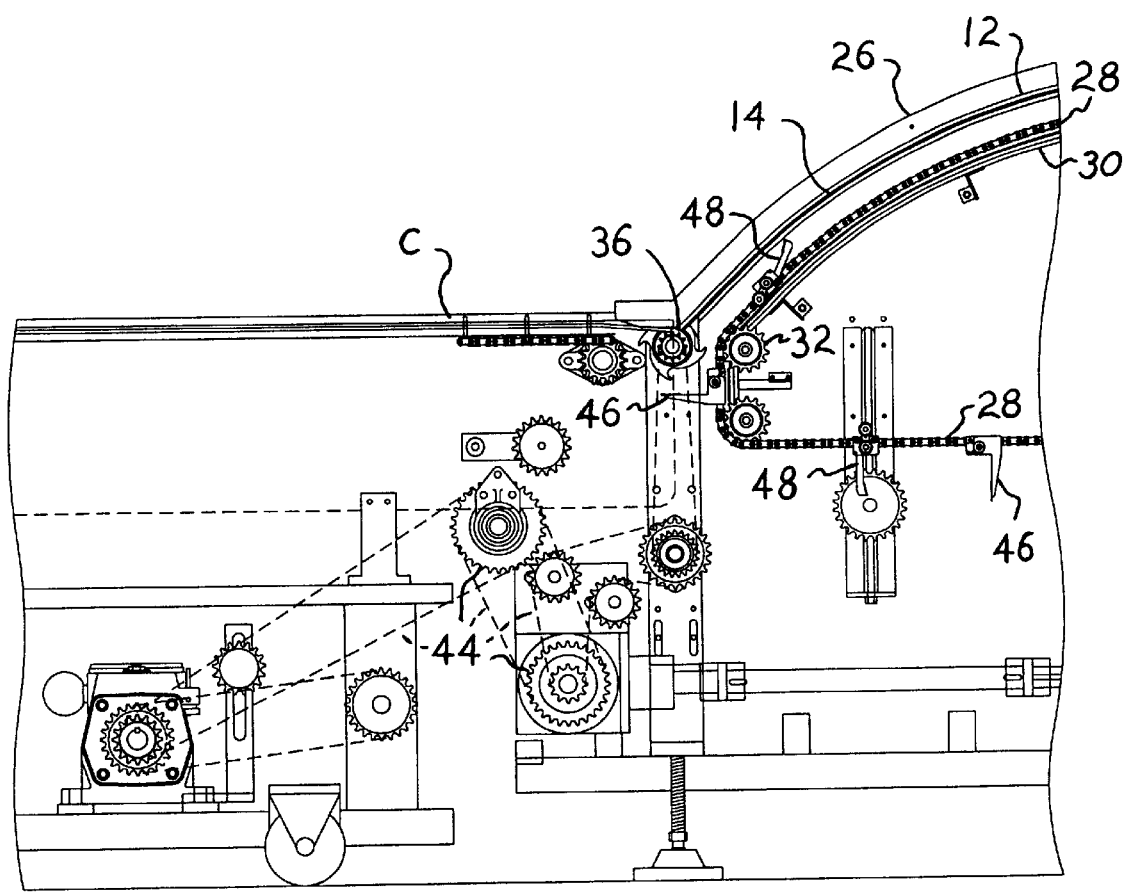
FIG. 2A is a side elevation view in section, showing the transition from a transfer conveyor line to the initial or stacking portion of the present infeed slug loader.
Figure 2B:
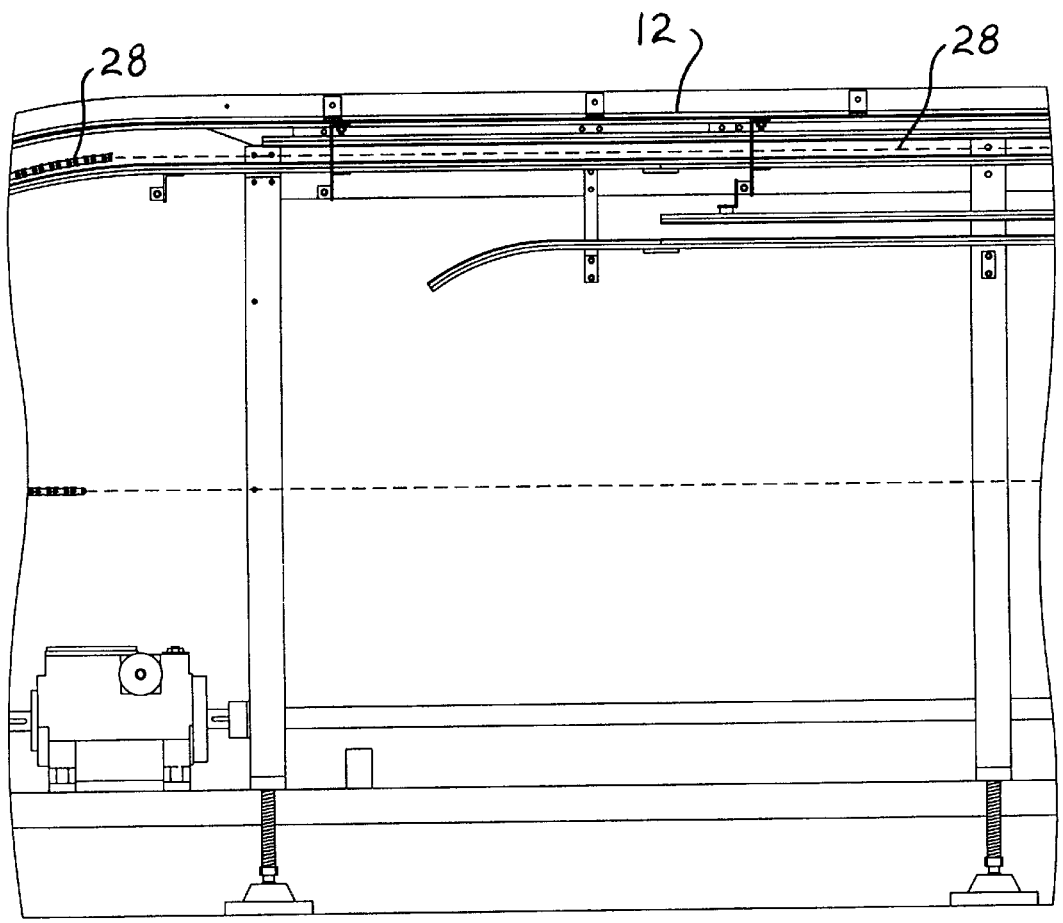
FIG. 2B is a side elevation view in section of the infeed slug loader assembly extending from the upper portion of the slope to the right side of FIG. 2A, to the line merging area.
Figure 2C:
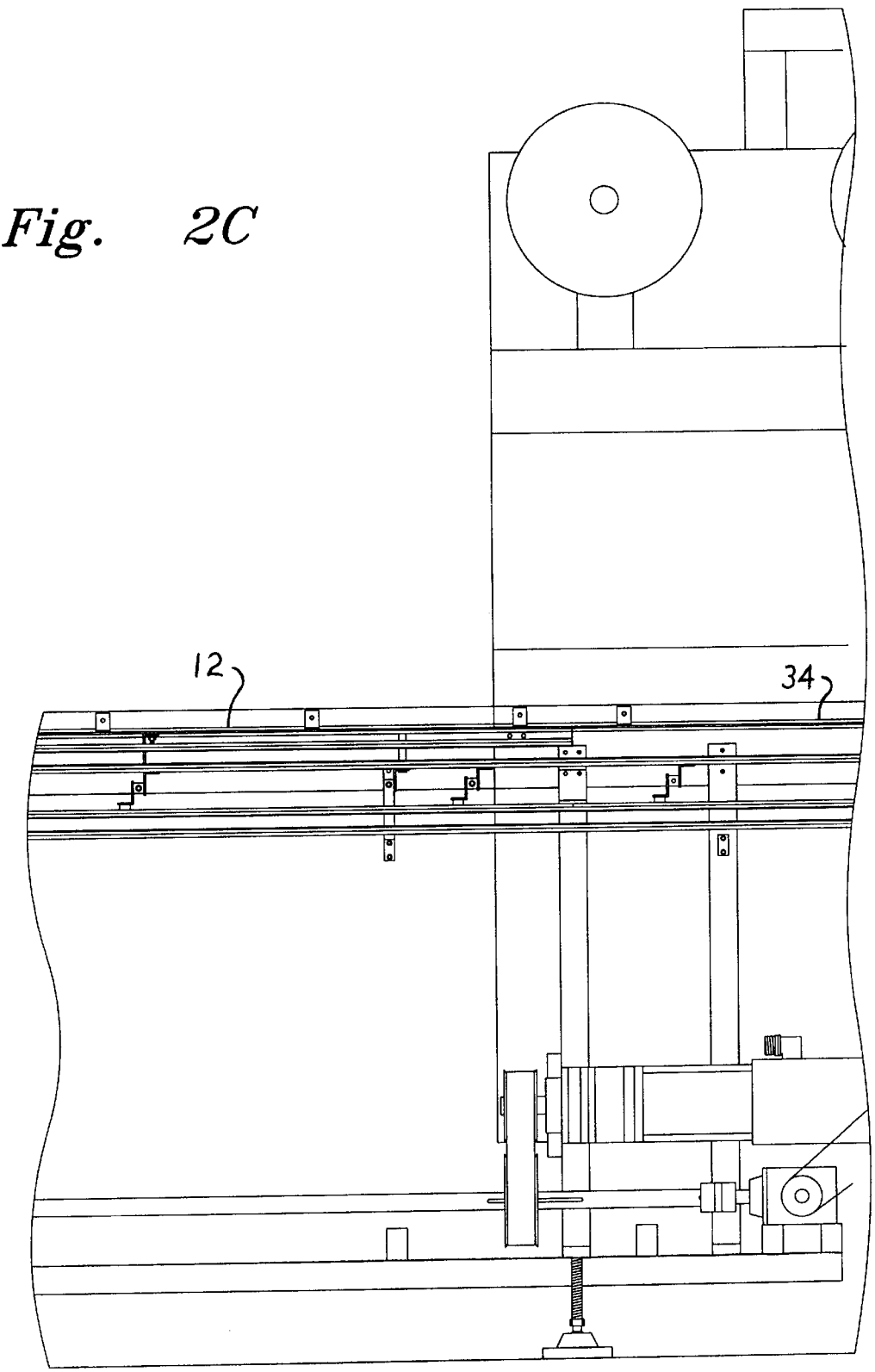
FIG. 2C is a side elevation view in section of the assembly extending from the right side of FIG. 2B, to the completion of the merge area and to the wrapping machine area.

FIGS. 2A through 2C provide elevation views in section of the mechanism of the present infeed slug loader 10. The present slug loader 10 is driven by an endless roller chain drive, with the chain 28 running beneath the top plate 12 and held adjacent thereto by a guide 30. The roller chain 28 extends from a tail sprocket 32 which is located immediately beneath the base of the slope 14, and slopes upwardly immediately beneath the arcuately curved slope 14 to continue its run beneath the horizontal portion 16 of the run, shown in FIGS. 2B and 2C. (The roller chain 28 run is indicated by a dashed line in FIG. 2B and is not shown in FIG. 2C, for clarity in the drawing Figures.) The roller chain 28 continues its run to a conventional lead sprocket (not shown, but essentially identical to the tail sprocket at the forward end of the chain 28 run), thence returning to the tail sprocket 32. Additional sprockets and mechanical means are provided for slack adjustment in the chain 28, adjusting the chain 28 for registry with other conveyor systems of the operation, etc., as is conventionally known in the conveyor industry.

The slotted top plate 12 extends from the base of the slug stacking or forming slope 14, up the slope 14, along the horizontal portion 16 of the run, to the distal end 34 of the horizontal run 16 and beyond the merging area 22 of the machine 10, as shown generally in FIG. 2C of the drawings. As noted above, the top plate 12 is positioned immediately above and adjacent to the upper run of the chain 28, with various guides (e. g., guide 30) and sprockets maintaining the chain 28 run immediately below the top plate 12. Thus, the pins or fingers (discussed further below) intermittently spaced along the chain 28 will extend upwardly through the slot(s) 18, 20, and 24 of the plate 12, for moving the slugs along the top plate 12, generally as shown in FIG. 3.

Figure 6:
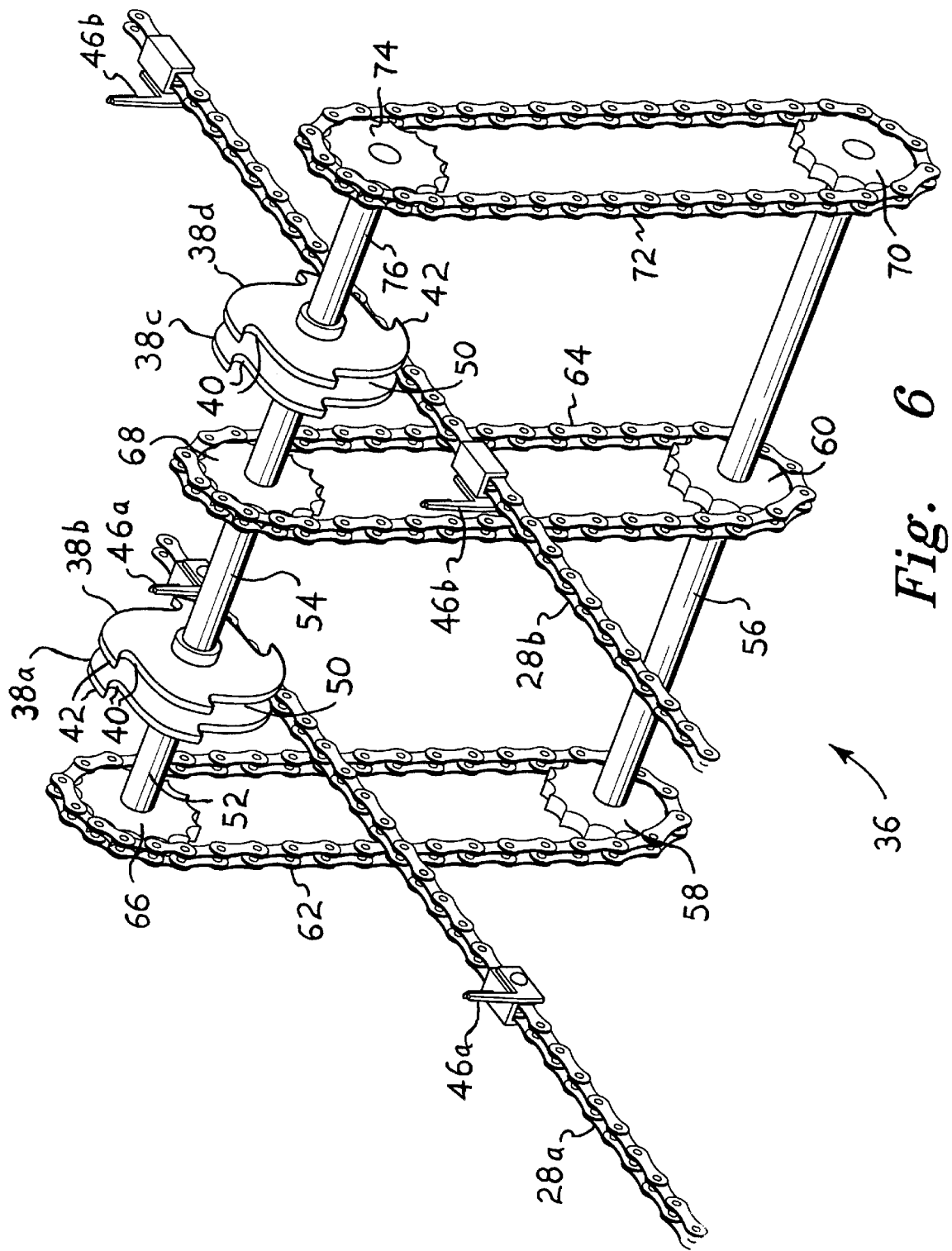
FIG. 6 is a detailed perspective view showing the drive means for the split turnover wheels for two stacking lines.

FIG. 4 provides a more detailed view of the interface between the transfer conveyor C and the beginning of the present infeed slug loader conveyor system 10. A turnover wheel assembly 36 is positioned at the base of the slug stacking slope 14 adjacent the tail sprocket 32 (shown in FIG. 2A), for accepting individual articles A and forming stacks, or slugs S, of such articles A at the base of the slope 14. The turnover wheel assembly 36 is more clearly shown in FIG. 6 of the drawings. The assembly 36 comprises a series of turnover wheels, e. g., 38a through 38d, with each of the wheels having a series of evenly spaced receptacles 40 and corresponding retainers 42. (It will be noted that the perspective view of FIG. 6 shows four wheels 38a through 38d operating with two chains 28a and 28b, but the principle is adaptable to one or more chain runs as desired.)

The wheels 38a through 38d operate by rotating in the same direction as the chain 28 and the transfer conveyor C run, i. e., from left to right or clockwise in FIGS. 2A through 2C and 4. The rotational speed of the wheels 38a through 38d is in registry with the speed of the transfer conveyor C, by means of the interconnecting mechanical chain drive 44 shown in FIG. 2A. Thus, as individual articles A from the transfer conveyor C arrive at the wheels 38a–38d, they are picked up in the receptacles 40 of the wheels, held in position on the wheels by the retainers 42 thereof, and rotated about the axis of rotation of the wheels to be deposited on edge at the base of the slug forming slope 14, as shown in FIG. 4. As the next individual article A approaches the wheels 38a through 38d, the relatively higher retainer portions 42 lift the preceding trailing article from its position at the bottom of the stack, with the receptacle 40 containing the next article A carrying that next article into position at the bottom of the slug S. The process continues until a predetermined number of articles A have been stacked to form the stack or slug S.

It will be noted that no retaining means is required for the leading article A of the slug S being formed, due to the slope 14 of the present slug loader 10. Gravity retains the articles A in a stacked configuration along the base of the slope 14, with the turnover wheel assembly 36 adding sequentially to the slug S with each insertion of an additional article A to the bottom or trailing portion thereof. No retaining means is required for the leading ends of the slugs S until such time as they are advanced to the upper portion of the slope 14, thereby being oriented in a more horizontal disposition where the leading article A might fall from the front of the slug S unless retained. The slope 14 preferably has an initial slope of about 45 degrees, with a smoothly arcuate curvature to the horizontal portion 16 of the assembly. The curvature preferably has a relatively wide radius, in order to preclude any substantial or significant arcuate bowing or curvature of each of the slugs S as they travel up and over the slope 14. A slope having a radius of about 36 inches has been found to be suitable, but this may be revised according to the length of the slugs S being formed, the specific size and shape of the articles A, etc., as desired, with any given machine.

The chain 28 includes a series of evenly spaced, permanently extended trailing pins or fingers 46, and another series of evenly spaced, retractable leading pins or fingers 48. The trailing and leading pins 46 and 48 are alternately placed along the chain 28. As the slug S being formed at the base of the slope 14 reaches its predetermined size, one of the trailing pins 48 arrives at the base of the slug S, contacting the trailing article T thereof. The slug S is thus carried up the slope 14 by the advance of the trailing pin 48 as it is carried along by the movement of the chain 28 to which it is attached. The gap between the trailing pins 48 provides for several revolutions of the wheels 38a through 38d, for stacking another series of articles A for forming another slug S, which is again picked up by the next trailing finger or pin 48, and so forth, to advance the completed slugs S along the conveyor line.

As each completed slug S is lifted from the base of the slope 14 by one of the trailing pins 46, an opposite leading pin 48 extends to contact the leading article L of the slug S, thus sandwiching each slug S between one of the trailing pins 46 and a corresponding leading pin 48 along the chain 28. The corresponding leading and trailing pins 48 and 46 thus carry each completed slug S sequentially and linearly along the top plate 12 of the remainder of the conveyor run to a wrapping machine (not shown), positioned to the right of the assembly shown in FIG. 2C.

It will be seen that clearance must be provided for the permanently extended trailing pins or fingers 46, as they pass through the area of the turnover wheel assembly 36. This is accomplished by means of a pin clearance area 50 provided between each of the turnover wheels of each conveyor line, i. e., between the two wheels 38a and 38b, and between wheels 38c and 38d. Each wheel of each pair is driven by a separate shaft, as shown in FIG. 6 of the drawings. The leftmost wheel 38a is driven by a first shaft 52, while the corresponding adjacent wheel 38b is driven by a second shaft 54, thus leaving a pin clearance area 50 therebetween with the two wheels 38a and 38b not directly communicating with one another. This gap 50 allows the permanently extended trailing pin or finger to pass between the two wheels 38a and 38b, without having a shaft extending therebetween to interfere with the pin. A common shaft 56 turns a pair of sprockets 58 and 60 which operate a corresponding pair of chains 62 and 64, which in turn operate sprockets 66 and 68 to turn the two shafts 52 and 54.

The present infeed slug loader 10 may also provide for more than a single conveyor line, as will be discussed in detail further below. When multiple lines are used, the separation of adjacent turnover wheels is accomplished essentially as described above. In the case of the second pair of turnover wheels 38c and 38d, the third wheel 38c is driven by the opposite end of the shaft 54 by the chain 64, which is in turn driven by the sprocket 60 of the common shaft 56. The common shaft 56 includes an additional sprocket 70, which drives a chain 72 operating a sprocket 74. The sprocket 74 turns another shaft 76, which drives the fourth wheel 38d. As in the case of the two wheels 38a and 38b, it will be seen that the separate shafts 54 and 76 driving the two wheels 38c and 38d, provide a pin clearance area 50 between the two wheels 38c and 38d, allowing the permanently extended pins or fingers to pass therebetween.

As noted above, the trailing pins or fingers are permanently extended from the chain to which they are secured, and automatically pick up the trailing article in a completed stack or slug of articles as each trailing pin reaches that point. However, it will be seen that some means must be provided for retracting the leading pins or fingers to pass beneath the slug assemblies as they are being formed, in order to preclude premature movement of the slugs up the slope and along the conveyor run before they are completely assembled or stacked.

Figure 7:
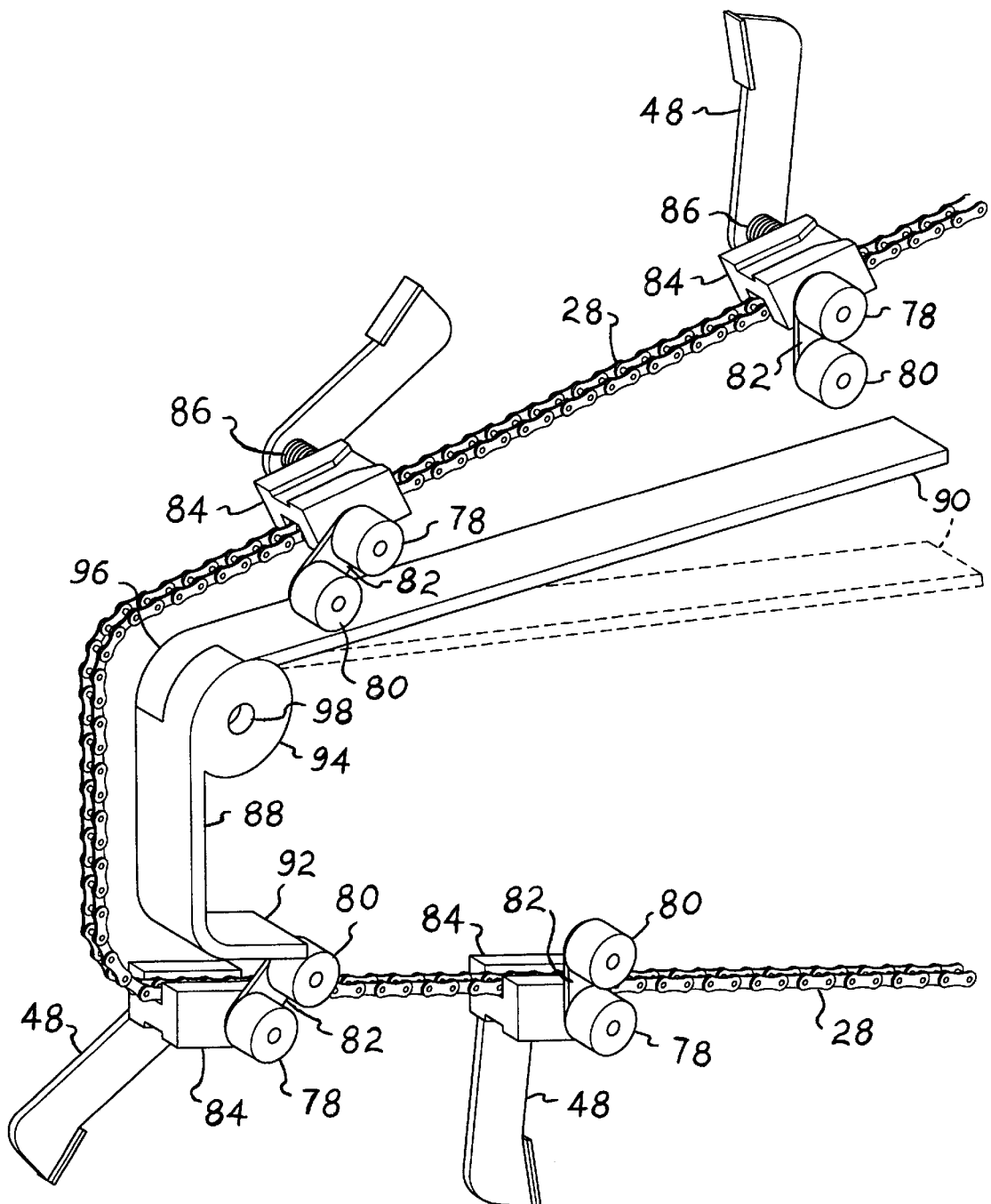
FIG. 7 is a detailed perspective view of the cam ramp assembly and pivoting lead pin or finger mechanism.

FIG. 7 illustrates the pin or finger retraction system used for retracting the leading pins 48 of the present invention, with FIG. 7 disclosing a simplified detail view of the chain and pin action at the tail sprocket and turnover wheel area. (The trailing pins are not shown in FIG. 7, for clarity in the drawing Figure.) Each of the leading pins 48 includes a guide roller 78. A retracting roller 80 is secured to a pivot arm 82, which attaches to the pivot shaft of the guide roller 78 and is immovably affixed relative to the lead pin 48, i. e., the lead pin 48 and pivot arm 82 pivot as a unit about their common shaft. A spring 86 is provided to urge the lead pin 48 to an extended position generally normal to the chain 28. Thus, the pivot arm 82 and its attached leading pin 48 are pivotally mounted relative to the guide block 84 and chain 28 to which the guide block 84 is affixed.

A cam ramp is provided beneath the chain 28, in the area of the tail sprocket and below the initial or lower portion of the slope 12. The ramp includes a lower or initial portion 88 for retracting the lead pins 48, with an upper or following portion 90 extending therefrom for allowing the lead pins 48 to extend. The lead or initial portion 88 may have a generally "L" shape, with the first end 92 extending for a short distance along the return run of the chain 28. As the retracting roller 80 contacts the first end 92 of the lead portion 88, the pivot arm 82 is caused to pivot rearwardly relative to the direction of travel of the lead pin assembly 48, thus causing the lead pin 48 to rock or pivot forwardly, as shown by the lower left assembly in FIG. 7. It will be seen that the positioning of the cam ramp assembly relative to the chain 28 run, will affect the degree of retraction of the lead pins 48. The lead pins 48 need not be completely retracted to lie parallel to the chain 28 run, but must be retracted sufficiently to pass beneath the stack or slug being assembled at the base of the sloped area 14.

Due to the proximity of the face of the cam ramp to the chain 28 run, each of the lead pins 48 will remain substantially retracted as they continue about the tail sprocket (not shown in FIG. 7, for clarity in the drawing Figure) until reaching a point somewhat above the base of the slope 14 and the upper end of any slug S being formed thereon. However, the cam ramp assembly provides for adjustment of the upper portion 90 thereof. Complementary semicircular bosses, respectively 94 and 96, are provided at the mating ends of the two cam ramp portions 88 and 90, with the two bosses 94 and 96 being mutually laterally offset from one another to provide a linear cam ramp run, with the upper cam ramp boss 90 pivoting relative to the lower cam ramp boss 88 about a common axis 98. Thus, the angle or slope of the upper or following cam ramp portion 90 may be adjusted, to provide for a more rapid or slower extension of the leading pin arms 48, as desired.

In view of the detailed showing of the lead pin retraction means of FIG. 7, the general operation of the present invention will be understood by referring back to FIG. 4 of the drawings. In FIG. 4, the individual articles A are advanced in tandem, linearly along the transfer conveyor C until reaching the turnover wheel assembly 36. The turnover assembly 36 takes up each article in turn, and deposits it at the base of the slug stacking slope 14 for forming a slug S thereon. No lead retaining means is required, due to the substantially 45 degree angle of the slug forming slope 14, which retains the slug S being formed thereon due to gravity.

As the slug S approaches its predetermined maximum size (adjusted by adjusting the number of cycles of the article pickup receptacles 40 of the turnover wheel assembly 36, per the spacing of each trailing pin 46 along the chain 28), one of the leading pins 48, in its retracted state due to the cam ramp assembly, passes beneath the nearly complete slug S. Simultaneously, a corresponding one of the permanently extended trailing pins 46 passes between the corresponding turnover wheel discs 38a, 38b or 38c, 38d and picks up the trailing article T of the now completed slug S. The corresponding lead pin or finger 48 has now reached the lead article position L of the newly formed slug S, and its retracting roller has rolled down the upper or following section 90 of the cam ramp assembly, thereby allowing the lead pin 48 to extend. The trailing and lead pins 46 and 48 are spaced along the chain 28 to sandwich the newly formed slug S therebetween, carrying the slug S up the slope 14 and along the remainder of the run.

Figure 5:
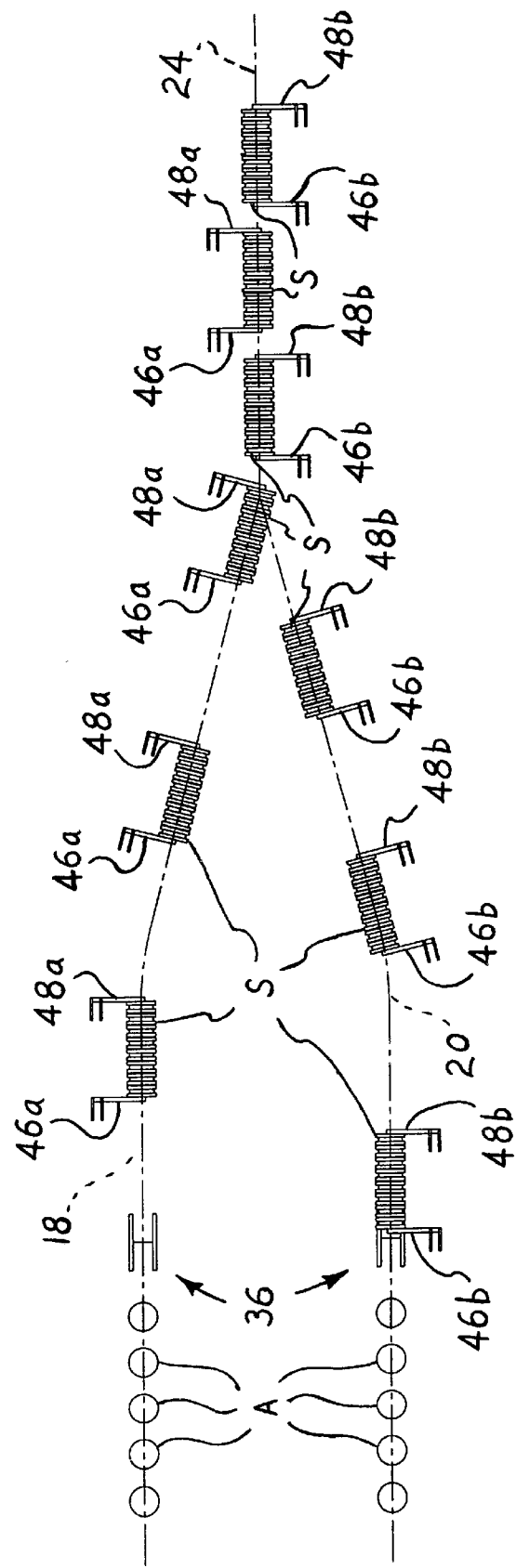
FIG. 5 is a schematic top plan view showing the merging of the two lines into a single line.

To this point, the primary emphasis has been placed upon the structure and operation of only a single slug forming line. However, a review of FIGS. 1, 3, 5, and 6 illustrate the means providing for multiple slug forming lines (at least two), which are merged into a single line for conveying to the wrapper machine. FIG. 3 provides a simplified illustration of the general configuration of the merging means of the present infeed slug loader 10. In FIG. 3, two separate chains, respectively 28a and 28b, are shown schematically by broken lines. These chains 28a and 28b preferably comprise side flexing roller chains, as they must be capable of flexing laterally. FIG. 5 is similar to FIG. 3, but provides a top plan view showing schematically the two slots or tracks 18 and 20 and their merging into a single track 22, rather than showing the chain 28a and 28b runs.

Each chain 28a and 28b carries a series of leading and trailing fingers or pins, respectively 48a and 46a for the chain 28a, and 48b and 46b for the chain 28b. Each of the pins 48a, 46a, 48b, and 46b is laterally offset inwardly, toward the opposite chain 28a or 28b. In other words, the pins 46a and 48a extend from the right hand or inward sides of their respective chain attachment guide blocks, with the pins 46b and 48b extending from the inward or left hand sides of their respective chain attachment guide blocks. FIG. 7 illustrates the left side offset of such pins for the right side chain mechanism, and it will be understood that the left side mechanism is a mirror image of that shown in FIG. 7.

It will be seen in FIG. 3 that the first and second chains 28a and 28b are laterally spaced apart from one another even in the merged area, in order to preclude interference with one another. By forming a predetermined offset distance for each of the pins 46a, 48a, 46b, and 48b from their respective roller chains, with the distance being equal to one half the distance between the two chains 28a and 28b in the merged area, it will be seen that the pins 46a and 48a will be aligned with the pins 46b and 48b in the merge area and will thus travel along the single slot 24 of the merge area of the horizontal run of the present infeed slug loader 10, as shown in FIGS. 1, 3, and 5 of the drawings.

It will also be noted in FIGS. 3, 5, and 6 of the drawings, that the corresponding pins on each of the chains 28a and 28b, e.g., pins 46a and 46b, are not laterally aligned with one another. That is, a leading pin 46a along the first chain 28a is longitudinally offset or staggered from its counterpart trailing pin 46b on the opposite chain 28b. The same is true of the leading pins 48a and 48b and their relationships to one another along the two chains 28a and 28b. Each pair of leading and trailing pins, i.e., one leading pin 48a and one trailing pin 46a, are spaced apart along the chain so that they will capture or sandwich a slug S of a predetermined size or length therebetween as they travel along their respective slot 18 and reach the slug forming area 14 of the machine, as discussed in detail further above. Their counterpart pins 48b and 46b perform the same function in their respective slot 20 to the opposite side of the slug forming area 14.

If the counterpart pins 46a, 46b and 48a, 48b were laterally aligned with one another, it will be seen that they would interfere with one another upon reaching the merge area 22 and single track 24 of the machine 10. Moreover, even if they were slightly offset, the slugs S being carried by the pins 46a and 48a and those being carried by the pins 46b and 48b, would interfere with one another. Accordingly, the counterpart pins are offset or staggered from one another along their respective chains 28a and 28b, so that not only do the pins merge with one another without interference, but also the slugs S being carried by respective leading and trailing pins do not interfere with one another, but alternate their positions along the line to merge smoothly into an essentially continuous line of slugs S along the single slot 24 portion of the horizontal run 16.

While only two lines of stacking are shown merging into a single line in the present disclosure, it will be seen that additional lines may be constructed to merge into a single line, if so desired. This may be accomplished by varying the relative height of the additional chain runs to either side, thus allowing the offset arms of the fingers or pins to pass above or below the other chains. The offset arms of pins running on the outermost chains are longer than those of the pins of the inner chains, with the offset distances being formed to align the various pins into a single linear array in a single slot, essentially as described above.

In summary, the present infeed slug loader 10 provides further efficiencies in the conveyor industry, by greatly reducing the angles and bends of the conveyor paths of prior art stacking or slug forming machinery. This results in a significant reduction in breakage and damage to goods being processed on the present machine, relative to prior art machinery, thus resulting in a considerable improvement in operating economy. Further efficiency is provided by the fact that the present machine does not require any means for holding the forward or leading ends of the slugs being formed during their formation, due to the slope upon which they are formed. Gravity holds the forming slugs in an upright position along the slope, with the leading article of the slugs remaining in position during slug formation without need for additional mechanical restraint. The leading pin arrangement of the present machine may thus travel with its corresponding chain, rather than being required to remain in position as the slug is being formed. This results in a considerable reduction in mechanical complexity for the present infeed slug loader.

The present machine is capable of producing slugs of virtually any practicable size or length. Slug size is dependent upon the distance between trailing pins along the conveyor chain, relative to the number of revolutions of the turnover wheel and the number of receptacles in the wheel. For example, if a slug containing fourteen articles is desired, and there are four receptacles in each turnover wheel as described in the present disclosure (more or fewer may be provided), then the trailing pins are placed along the chain so that the turnover wheels make three and one half revolutions (thus, fourteen receptacle pickups of articles) for each trailing pin pass through the turnover wheel discs. As the turnover wheels are in mechanical registry with the conveyor chain and both its trailing and leading pins, as shown by the chain and sprocket linkage and relationship of FIG. 2A, adjustment for different sizes or lengths of slugs is easily accomplished.

The merge feature of the present infeed slug loader provides an essentially continuous and unbroken flow of slugs along the single path of the merge line. It will be seen that the formation of each of the slugs requires some amount of time, during which the conveyor chain continues to run. Thus, the wrapper machine at the distal end of the present infeed slug loader, would be accepting completed slugs for wrapping, only intermittently. By providing two laterally spaced apart slug stacking areas, one slug may be carried toward the wrapper while another slug is being formed. The merging feature of the present machine enables slugs formed on each line to merge alternatingly with one another, thus presenting an essentially continuous flow of completed slugs to the wrapping machine. Accordingly, the present infeed slug loader provides a significant advance and economy in the conveyor industry, which will be appreciated by those who have need of such handling and processing equipment.

It is to be understood that the present invention is not limited to the sole embodiment described above, but encompasses any and all embodiments within the scope of the following claims.

We claim:

1. An infeed slug loader for forming and conveying slugs, with each of the slugs comprising a plurality of articles and having a leading and an opposite trailing article position, comprising:

at least one infeed conveyor having a roller chain traveling beneath a slotted top plate for conveying articles thereon;

said roller chain extending from a tail sprocket, up a slug forming slope having a base adjacent said tail sprocket, along a generally horizontal run having a distal end to a lead sprocket adjacent thereto, and thence returning to said tail sprocket;

said top plate extending from said tail sprocket along said horizontal run to said distal end thereof, and disposed immediately adjacent to and above said roller chain;

a turnover wheel disposed adjacent said tail sprocket, for receiving sequentially disposed articles from a transfer conveyor and for forming a slug at said base of said slope by means of sequentially inserting single articles at the trailing article position of each of the slugs formed; and a plurality of leading pins and trailing pins alternately disposed along said roller chain and extending through said slot of said top plate, for sandwiching each of the slugs between one of said leading pins and a corresponding one of said trailing pins, for conveying each of the slugs sequentially and linearly from said base of said slope, up said slope, and along said generally horizontal run and atop said slotted top plate.

2. The infeed slug loader according to claim 1, wherein said generally horizontal run has a first portion extending from said slope, an intermediate portion, and a second portion extending from said intermediate portion, and said slope and said first portion of said generally horizontal run include at least two conveyor lines merged into a single conveyor line along said second portion of said generally horizontal run.

3. The infeed slug loader according to claim 2, including a first and an opposite second roller chain, with each said roller chain being a side flexing roller chain, with said first and said second roller chain being laterally widely spaced apart along said slope and said first portion of said generally horizontal run and merging along said intermediate portion of said generally horizontal run to be immediately adjacent one another along said second portion of said generally horizontal run.

4. The infeed slug loader according to claim 2, wherein said leading and said trailing pins are inwardly offset from said first and said second roller chain toward the opposite said roller chain, with each of said pins forming a single line along said second portion of said generally horizontal run.

5. The infeed slug loader according to claim 4, wherein said leading and said trailing pins of each said roller chain are staggered relative to said opposite roller chain, for even alternate spacing therebetween along said single line of said second portion of said generally horizontal run.

6. The infeed slug loader according to claim 1, wherein said leading pins are selectively retractable beneath a portion of said top plate.

7. The infeed slug loader according to claim 6, wherein:
each of said leading pins is pivotally secured to said roller chain and includes spring means urging each of said pins to an extended position generally normal to said chain, and a retracting roller; and
a cam ramp disposed beneath said top plate and along said slope for contacting said retracting roller of each of said leading pins for retracting each of said leading pins beneath said top plate along said slug forming slope and beneath the slugs being formed thereon as they are formed, and extending each of said leading pins to contact the leading article of the corresponding slug for capturing the slug between a corresponding one of said leading pins and a corresponding one of said trailing pins for conveying the slug therebetween and along said generally horizontal run.

8. The infeed slug loader according to claim 1, wherein said turnover wheel comprises a first and an opposite second wheel portion disposed to each side of said roller chain, with said first and said second wheel portion being driven by separate shafts and defining a pin clearance area therebetween for passage of at least said trailing pins therethrough.

9. The infeed slug loader according to claim 1, wherein said turnover wheel is in mechanical registry with said roller chain and said leading and trailing pins disposed thereon, with said turnover wheel making a predetermined number of revolutions for each of said trailing pins passing said turnover wheel, for stacking a predetermined number of articles along said slope for pickup by a corresponding one of said trailing pins.

10. The infeed slug loader according to claim 1, wherein said base of said slope has an incline of generally forty five degrees, and said slope includes an arcuately curved upper portion extending from said incline to said generally horizontal run with said arcuately curved upper portion of said slope having a radius of about thirty six inches.

11. An infeed slug loader for forming and conveying slugs, with each of the slugs comprising a plurality of articles and having a leading and an opposite trailing article position, comprising:
at least a first and a second infeed conveyor each having a roller chain traveling beneath a single top plate for conveying articles thereon, with said top plate including a plurality of slots formed therethrough, with each of said slots corresponding to one said infeed conveyor;
each said roller chain extending from a tail sprocket, up a slug forming slope having a base adjacent said tail sprocket, along a generally horizontal run having a distal end to a lead sprocket, and thence returning to said tail sprocket;
said top plate extending from each said tail sprocket along said horizontal run to said distal end thereof, and disposed immediately adjacent to and above each said roller chain;
a turnover wheel disposed adjacent each said tail sprocket, for receiving sequentially disposed articles from a transfer conveyor and for forming a slug at said base of said slope along each said roller chain by means of sequentially inserting single articles at the trailing article position of each of the slugs formed; and
said generally horizontal run having a first portion extending from said slope, an intermediate portion, and a second portion extending from said intermediate portion, with said at least said first and said second conveyor line merged into a single conveyor line along said second portion of said generally horizontal run.

12. The infeed slug loader according to claim 11, including a first and an opposite second roller chain, with each said roller chain being a side flexing roller chain, with said first and said second roller chain being laterally widely spaced apart along said slope and said first portion of said generally horizontal run and merging along said intermediate portion of said generally horizontal run to be immediately adjacent one another along said second portion of said generally horizontal run.

13. The infeed slug loader according to claim 11, including a plurality of leading pins and trailing pins alternately disposed along each said roller chain and extending through a corresponding one of said slots of said top plate, for sandwiching each of the slugs between one of said leading pins and a corresponding one of said trailing pins, for conveying each of the slugs sequentially and linearly from said base of said slope, up said slope, and along said generally horizontal run and atop said slotted top plate.

14. The infeed slug loader according to claim 13, wherein said leading and said trailing pins are inwardly offset from said first and said second roller chain toward the opposite said roller chain, with each of said pins forming a single line along said second portion of said generally horizontal run.

15. The infeed slug loader according to claim 14, wherein said leading and said trailing pins of each said roller chain are staggered relative to said opposite roller chain, for even alternate spacing therebetween along said single line of said second portion of said generally horizontal run.

16. The infeed slug loader according to claim 13, wherein said leading pins are selectively retractable beneath a portion of said top plate.

17. The infeed slug loader according to claim 16, wherein:
each of said leading pins is pivotally secured to said roller chain and includes spring means urging each of said pins to an extended position generally normal to said chain, and a retracting roller; and
a cam ramp disposed beneath said top plate and along said slope for contacting said retracting roller of each of said leading pins for retracting each of said leading pins beneath said top plate along said slug forming slope and beneath the slugs being formed thereon as they are formed, and extending each of said leading pins to contact the leading article of the corresponding slug for capturing the slug between a corresponding one of said leading pins and a corresponding one of said trailing pins for conveying the slug therebetween and along said generally horizontal run.

18. The infeed slug loader according to claim 11, wherein each said turnover wheel comprises a first and an opposite second wheel portion disposed to each side of a corresponding said roller chain, with each said first and said second wheel portion being driven by separate shafts and defining a pin clearance area therebetween for passage of at least said trailing pins therethrough.

19. The infeed slug loader according to claim 11, wherein each said turnover wheel is in mechanical registry with a corresponding said roller chain and said leading and trailing pins disposed thereon, with said turnover wheel making a predetermined number of revolutions for each of said trailing pins passing each said turnover wheel, for stacking a predetermined number of articles along said slope for pickup by a corresponding one of said trailing pins.

20. The infeed slug loader according to claim 11, wherein said base of said slope has an incline of generally forty five degrees, and said slope includes an upper portion extending from said incline to said generally horizontal run with said upper portion of said slope having a radius of about thirty six inches.

* * * * *